(12) United States Patent
West

(10) Patent No.: US 9,481,470 B2
(45) Date of Patent: Nov. 1, 2016

(54) INTERMEDIATE STRUCTURE FOR INDEPENDENTLY DE-MOUNTABLE PROPULSION COMPONENTS

(71) Applicant: Spirit AeroSystems, Inc., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 287 days.

(21) Appl. No.: 14/340,132

(22) Filed: Jul. 24, 2014

(65) Prior Publication Data

US 2014/0331496 A1 Nov. 13, 2014

Related U.S. Application Data

(62) Division of application No. 13/552,001, filed on Jul. 18, 2012, now Pat. No. 9,212,607.

(51) Int. Cl.
| | |
|---|---|
| *B64D 27/10* | (2006.01) |
| *F02C 7/20* | (2006.01) |
| *B64D 27/14* | (2006.01) |
| *B64F 5/00* | (2006.01) |
| *B64D 27/00* | (2006.01) |

(52) U.S. Cl.
CPC .............. *B64D 27/10* (2013.01); *B64D 27/14* (2013.01); *B64F 5/0009* (2013.01); *F02C 7/20* (2013.01); *B64D 2027/005* (2013.01); *Y02T 50/66* (2013.01); *Y02T 50/672* (2013.01); *Y10T 29/49229* (2015.01)

(58) Field of Classification Search
CPC ...... B64D 27/10; B64D 27/12; B64D 27/14; B64D 2027/005; B64F 5/0036; F02C 7/20
See application file for complete search history.

(56) References Cited

U.S. PATENT DOCUMENTS 5,443,229 A * 8/1995 O'Brien ................. B64D 27/20
244/54

* cited by examiner

*Primary Examiner* — Nicholas McFall
(74) *Attorney, Agent, or Firm* — Hovey Williams LLP

(57) ABSTRACT

An intermediate structure of an aircraft configured to mechanically attach an engine core and an engine fan module to each other and to the aircraft. The intermediate structure may have a ring-shaped portion and/or an elongated mount beam extending substantially perpendicularly from the ring-shaped portion. The ring-shaped portion may have a forward edge and an aft edge opposite of the forward edge, and may include a first attachment portion for attaching to a flange of the engine core, a second attachment portion for attaching to a flange of the engine fan module, and a mounting portion configured for mounting directly to a pylon or airframe of an aircraft. The engine core and/or the engine fan module may independently mechanically attach to and detach from the intermediate structure. The intermediate structure may have a gearbox mounted thereto for interfacing with rotary components of the engine core and the engine fan module.

20 Claims, 8 Drawing Sheets

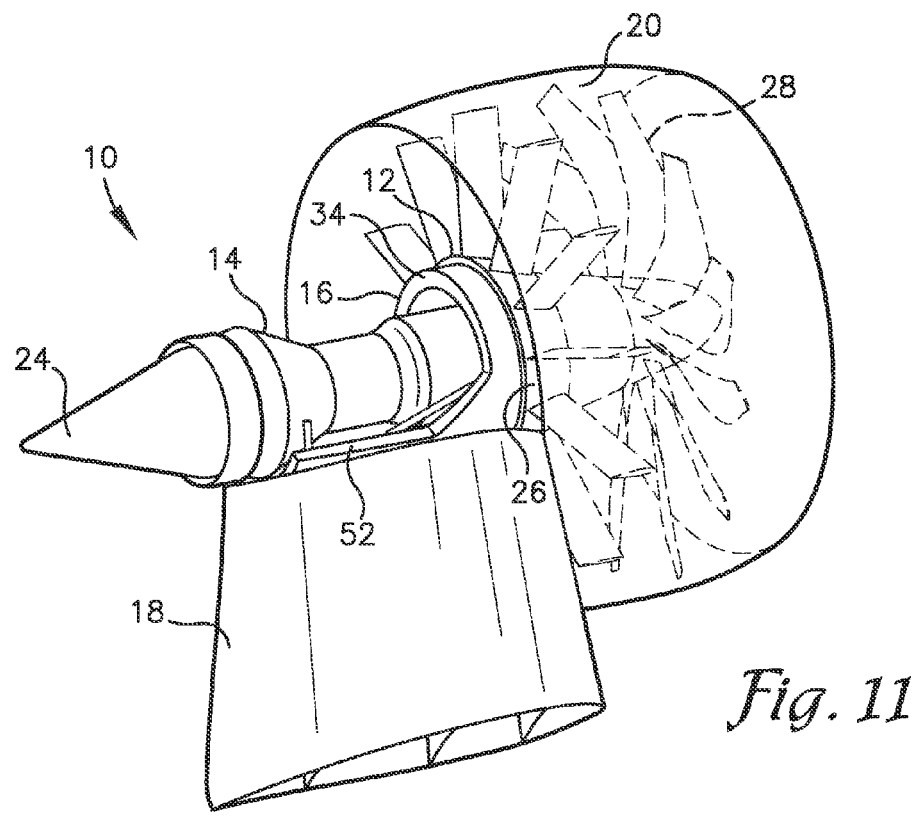
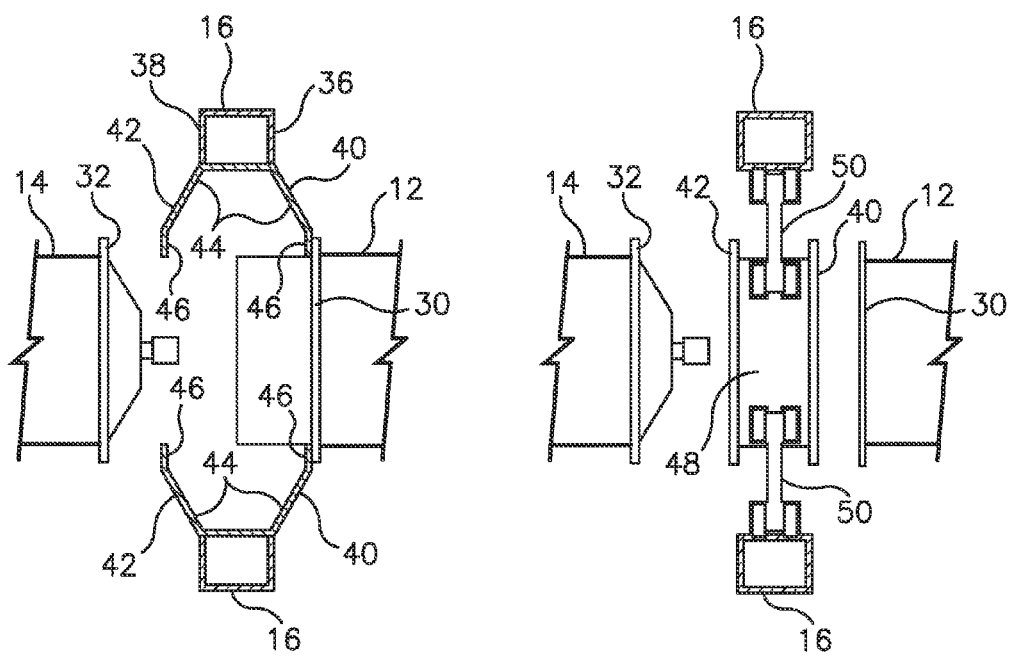
Fig. 11
Fig. 12    Fig. 13

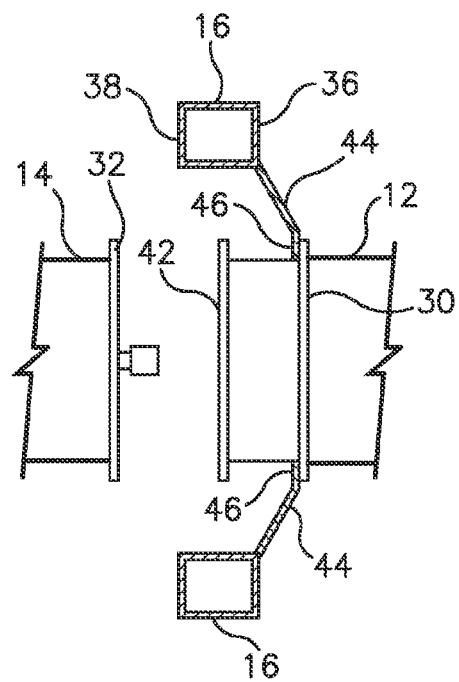
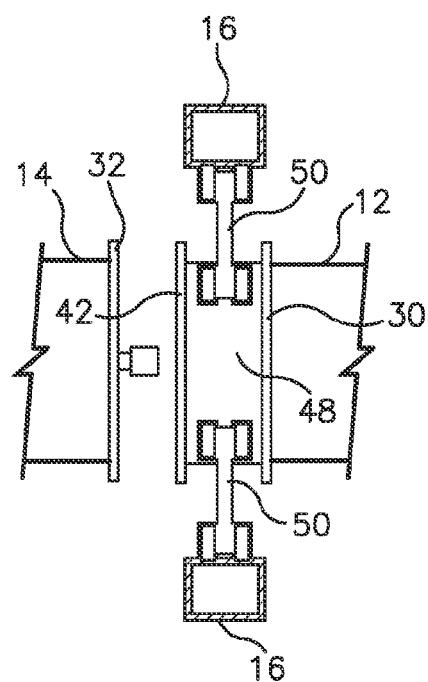
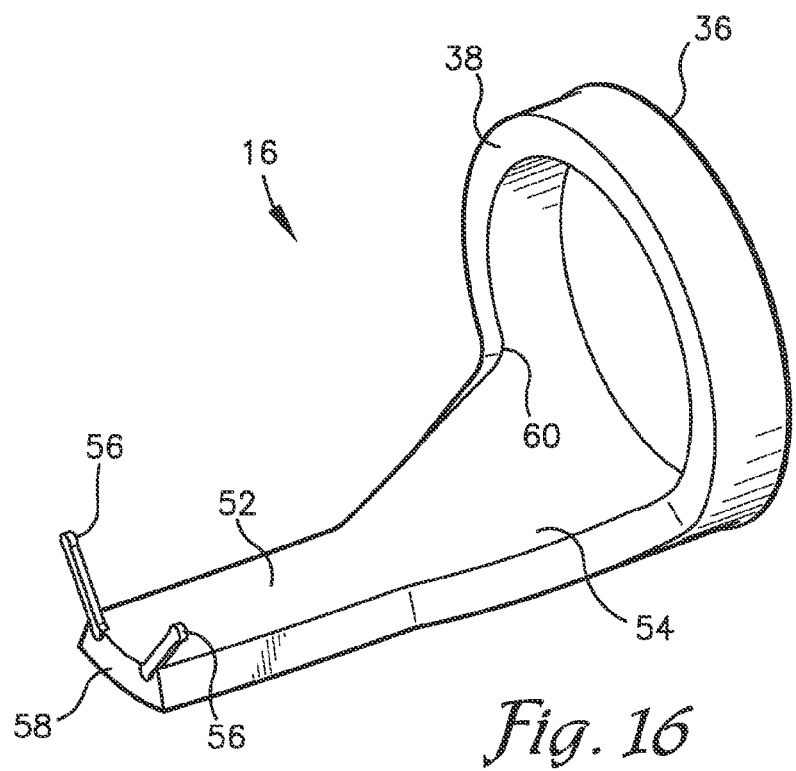

INTERMEDIATE STRUCTURE FOR INDEPENDENTLY DE-MOUNTABLE PROPULSION COMPONENTS

RELATED APPLICATIONS

This divisional non-provisional application claims priority benefit of a parent non-provisional application entitled, "Intermediate Structure for Independently De-mountable Propulsion Components," Ser. No. 13/552,001, filed Jul. 18, 2012 and incorporated by reference herein in its entirety.

BACKGROUND

A typical aircraft propulsion system may include an engine having an engine fan module and an engine core or hot section, as well as a nacelle inlet and/or a primary exhaust plug and nozzle. The engine components occasionally require maintenance, removal, and/or replacement.

Aircraft propulsion systems mounted on aft fuselage, or empennage, are a challenge to maintenance personnel for ready access and ergonomics. Tall stands are generally required to gain access to these propulsion systems. For example, in single-aisle, 150-seat class aircrafts with open-rotor propulsion systems, the rotor diameters may exceed fourteen feet in diameter. Positioned high on the aft fuselage, these installations are a considerable distance above the ground and therefore difficult to reach.

It is also difficult to perform an engine change on a high-mounted propulsion installation, partially due to the size and weight of the propulsion unit. In current aircraft propulsion systems, even if only the engine core requires off-wing maintenance, the entire aircraft propulsion system must be removed. This requires robust ground support equipment (GSE) and navigating the cumbersome fan module with its fourteen foot diameter rotor disc around the aircrafts nearby pylon, tail, and fuselage structures.

Accordingly, there is a need for an improved method of mounting and demounting an aircraft propulsion system that overcomes the limitations of the prior art.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Embodiments of the present invention solve the above-mentioned problems and provide a distinct advantage in the art of aircraft propulsion system mounting. More particularly, embodiments of the present invention provide an intermediate structure of an aircraft configured to mechanically attach an engine core and an engine fan module to each other and the aircraft. The intermediate structure may have a first attachment portion, a second attachment portion, and a mounting portion. The first attachment portion may be configured for attaching to a flange of the engine core and the second attachment portion may be configured for attaching to a flange of the engine fan module. The mounting portion may be configured for mounting directly to a pylon or airframe of an aircraft.

In another embodiment of the invention, the intermediate structure may comprise a ring-shaped portion made of a rigid material and having a forward edge and an aft edge opposite of the forward edge. The ring-shaped portion may comprise a first attachment portion, a second attachment portion, and a mounting portion. The first attachment portion may be configured for attaching to a flange of the engine core and the second attachment portion may be configured for attaching to a flange of the engine fan module. The mounting portion may be configured for mounting directly to a pylon or airframe of an aircraft. Furthermore, the intermediate structure may comprise an elongated mount beam having a first end integrally formed with and extending substantially perpendicular from the forward or aft edge of the ring-shaped portion and a second end opposite of the first end for structurally supporting the engine core.

Another embodiment of the invention includes a method of coupling and decoupling an engine core with an engine fan module via an intermediate structure of an aircraft. The intermediate structure may have a ring-shaped portion made of a rigid material and mounted directly to a pylon or airframe of the aircraft. The method may include the steps of mechanically attaching the engine core to the intermediate structure at a first edge of the intermediate structure and mechanically attaching the engine fan module to the intermediate structure at a second edge of the intermediate structure. The second edge of the intermediate structure may be opposite of the first edge. Finally, the is method may include step of mechanically disconnecting and removing one of the engine core and the engine fan module from the intermediate structure while another one of the engine core and the engine fan module remains mechanically attached to and supported on the aircraft by the intermediate structure.

BRIEF DESCRIPTION OF THE DRAWING FIGURES

A preferred embodiment of the present invention is described in detail below with reference to the attached drawing figures, wherein.

Figure 1:
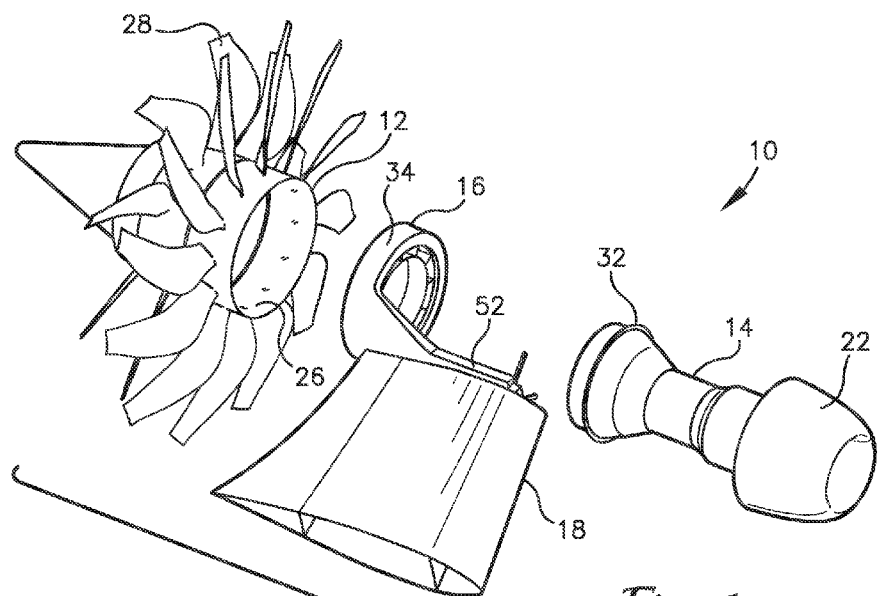
FIG. 1 is an exploded perspective view of an aircraft pylon, a propulsion system having a "pusher" configuration, and an intermediate structure constructed in accordance with an embodiment of the present invention.
Figure 2:
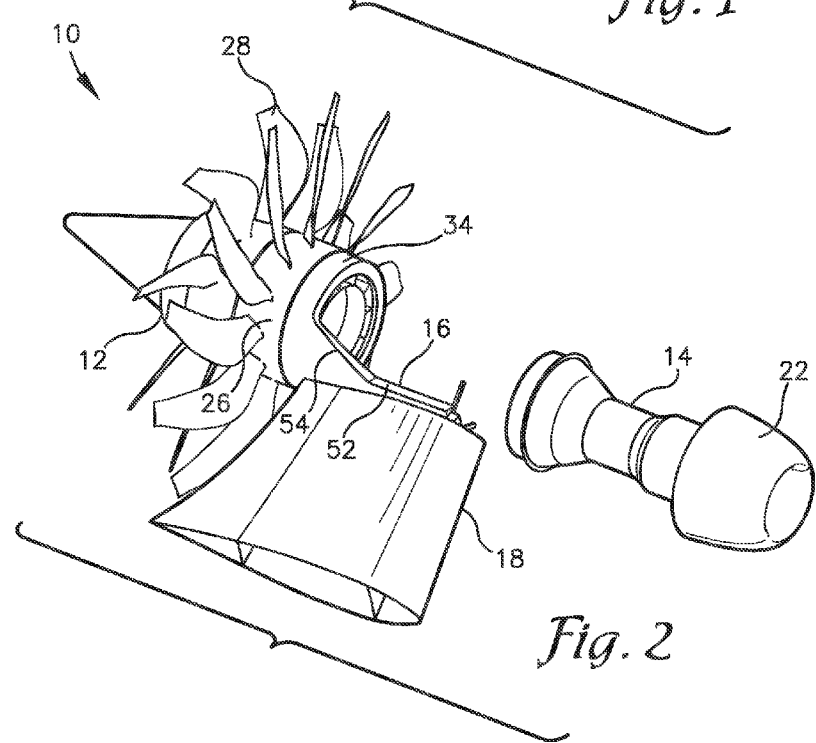
FIG. 2 is a perspective view of the pylon, propulsion system, and intermediate structure of FIG. 1, with an engine core of the propulsion system detached from the intermediate structure.
Figure 3:
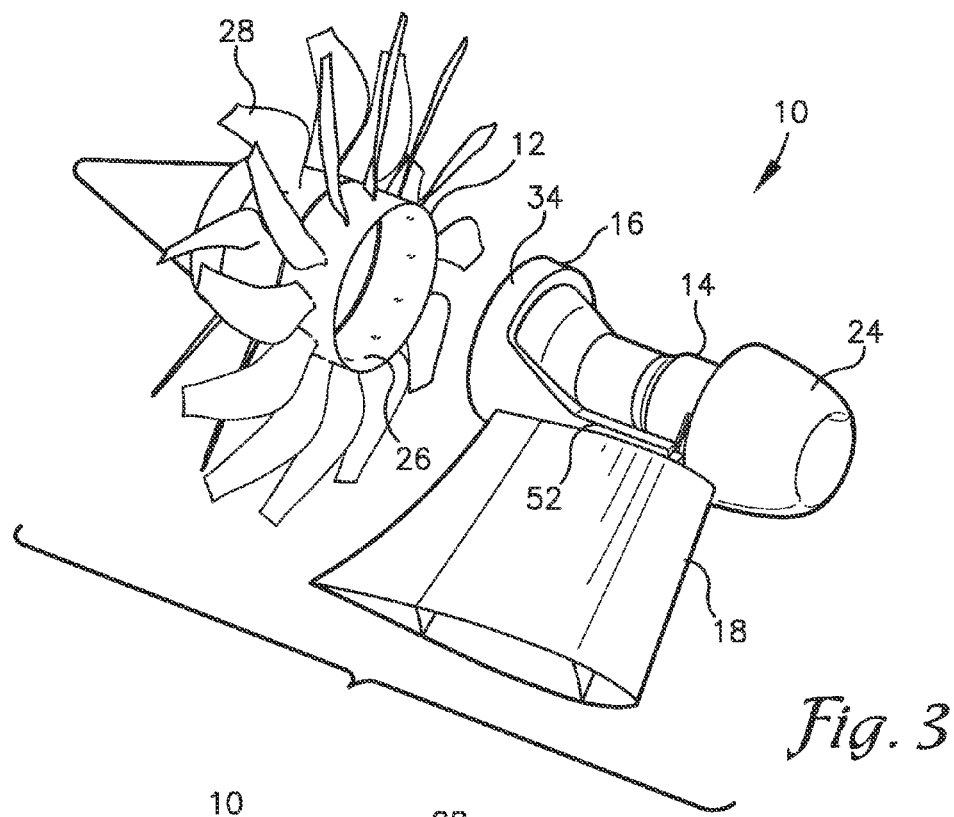
FIG. 3 is a perspective view of the pylon, propulsion system, and intermediate structure of FIG. 1, with an engine fan module of the propulsion system detached from the intermediate structure.
Figure 4:
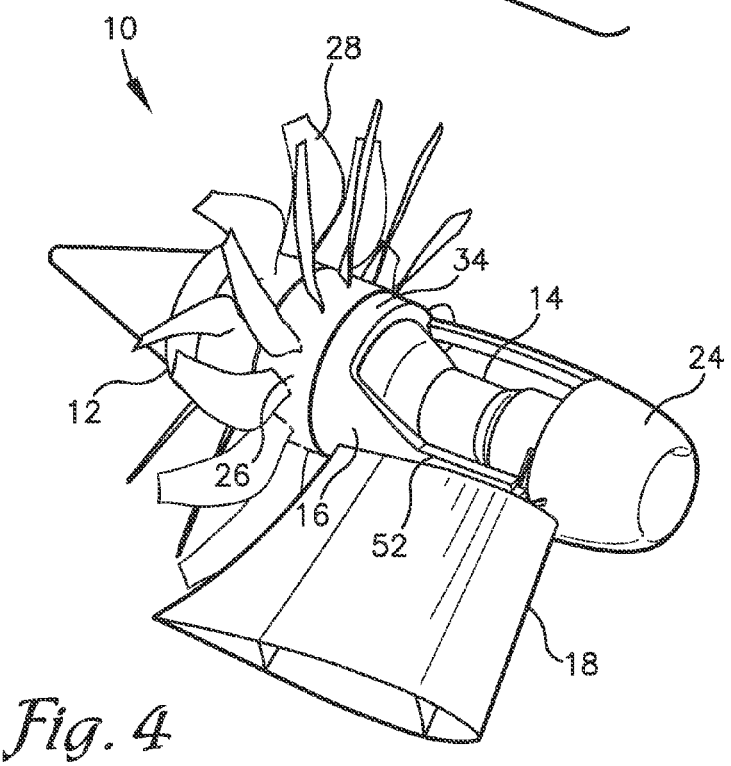
Figure 5:
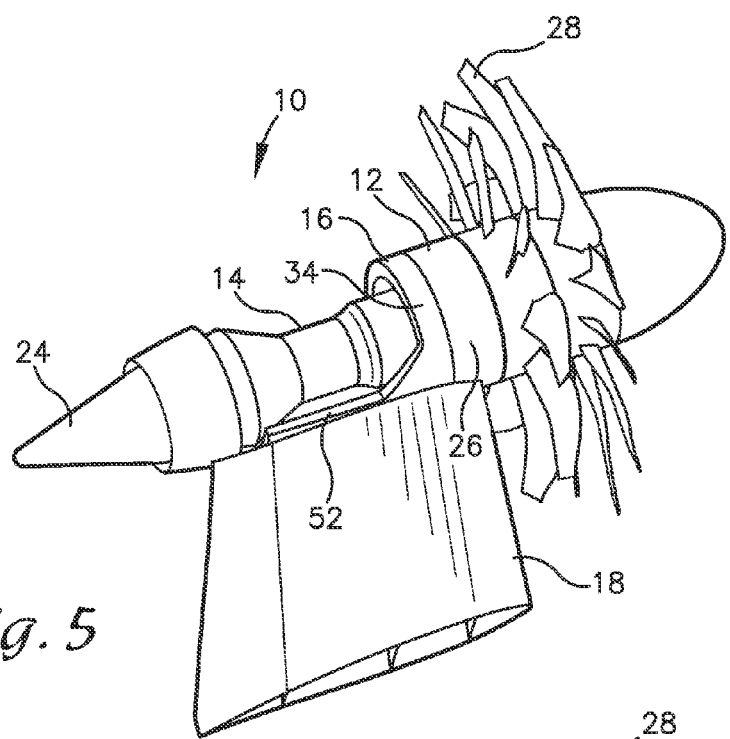
Figure 6:
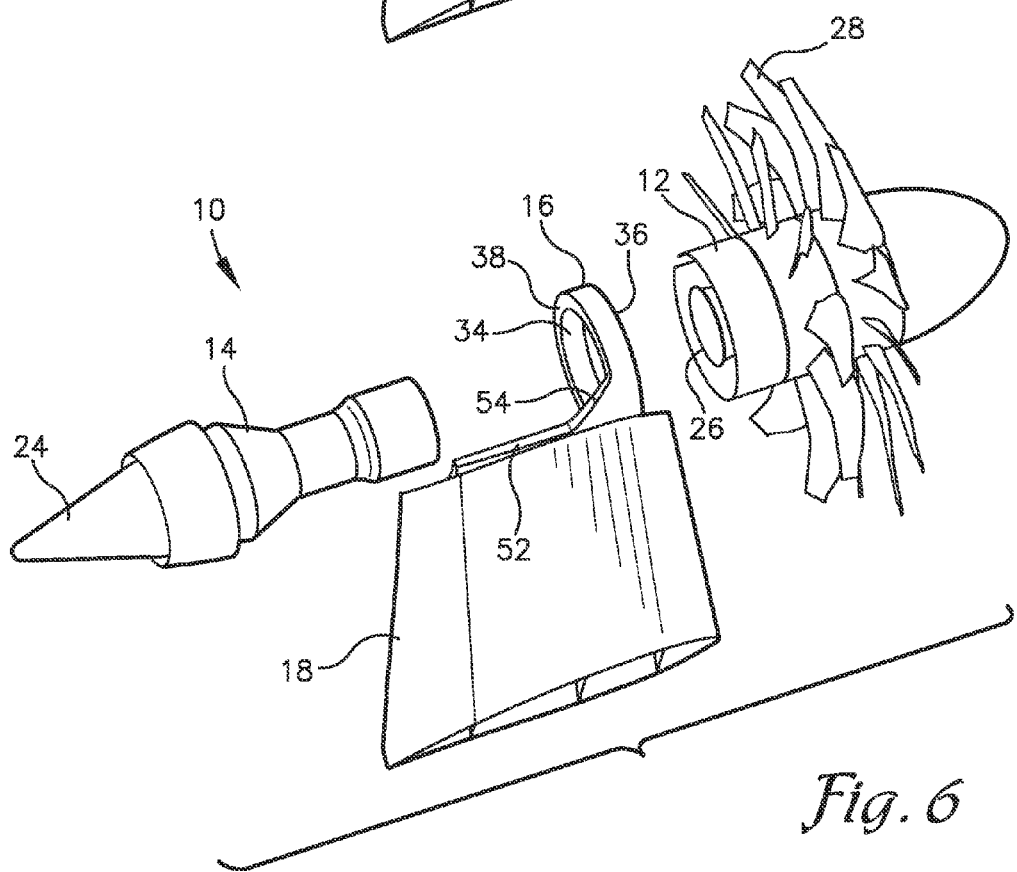
Figure 7:
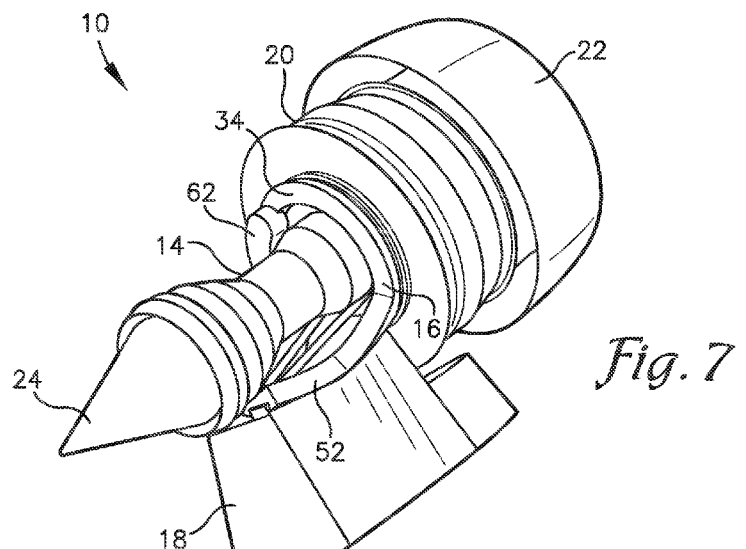
Figure 8:
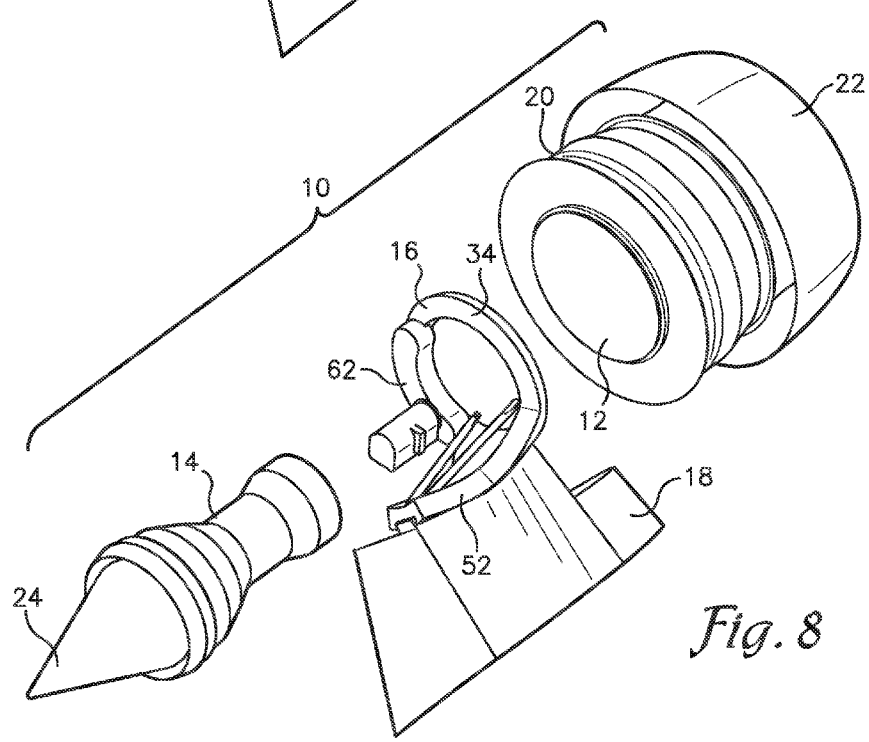
Figure 9:
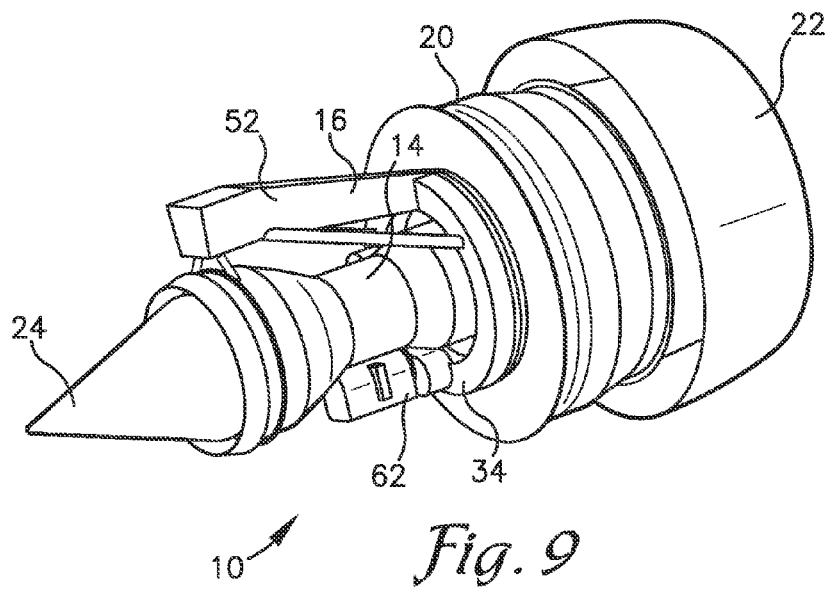
Figure 10:
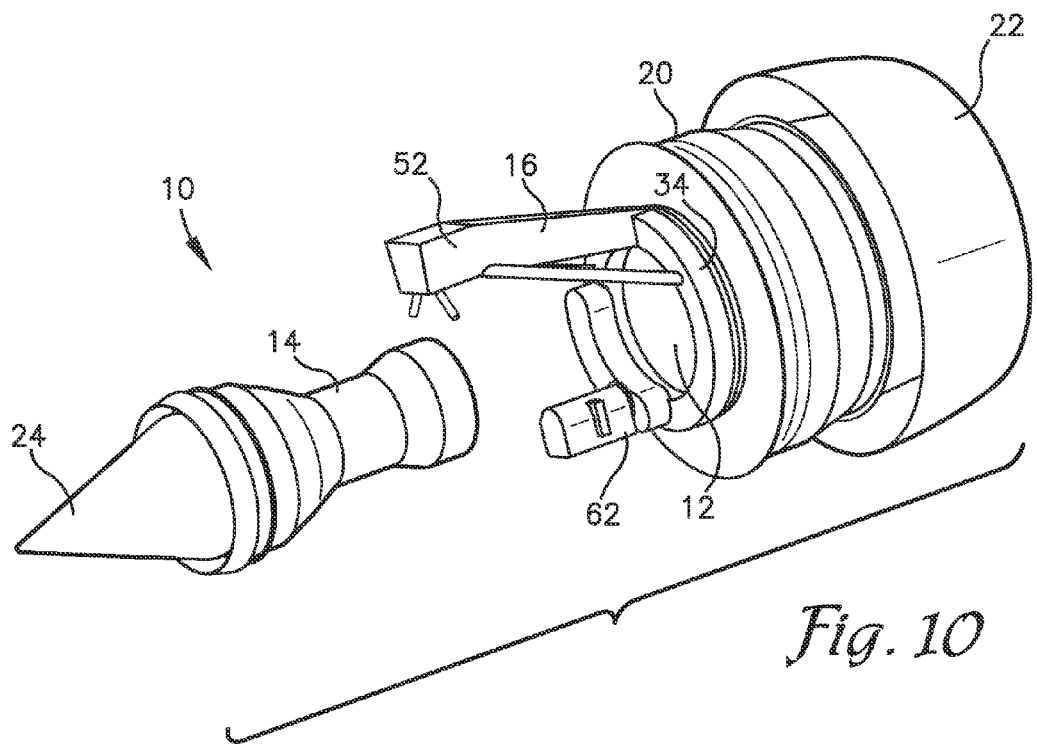

FIG. 4 a perspective view of the pylon, propulsion system, and intermediate structure of FIG. 1 with both the engine core and the engine fan module attached to and supported by the intermediate structure;

FIG. 5 is a perspective view of an alternative embodiment of the intermediate structure and propulsion system of FIGS. 1-4 arranged in a "puller" configuration;

FIG. 6 is an exploded perspective view of the intermediate structure and propulsion system of FIG. 5;

FIG. 7 is a perspective view of another alternative embodiment of the intermediate structure and the propulsion system of FIGS. 1-4, with the propulsion system comprising an empennage-mounted ducted turbo fan;

FIG. 8 is an exploded perspective view of the intermediate structure and propulsion system of FIG. 7;

FIG. 9 is a perspective view of another alternative embodiment of the intermediate structure and the propulsion system of FIGS. 1-4, with the propulsion system comprising an under-wing mounted ducted turbo fan;

FIG. 10 is a perspective view of the intermediate structure and propulsion system of FIG. 9 with the engine core of the propulsion system detached from the intermediate structure;

FIG. 11 is a perspective view of yet another alternative embodiment of the intermediate structure and the propulsion system of FIGS. 1-4, with the propulsion system having a ducted prop-fan installation;

FIG. 12 is a fragmentary side view of the propulsion system and a first embodiment of the intermediate structure of FIG. 1 configured to detachably attach to both the engine fan module and the engine core;

FIG. 13 is a fragmentary side view of the propulsion system and a second embodiment of the intermediate structure of FIG. 1 configured to detachably attach to both the engine fan module and the engine core;

FIG. 14 is a fragmentary side view of the propulsion system and a third embodiment of the intermediate structure of FIG. 1 integrally and permanently attached to the engine fan module and configured to detachably attach to the engine core;

FIG. 15 is a fragmentary side view of the propulsion system and a fourth embodiment of the intermediate structure of FIG. 1 integrally and permanently attached to the engine fan module and configured to detachably attach to the engine core;

FIG. 16 is a perspective view of the intermediate structure of FIG. 1; and

Figure 17:
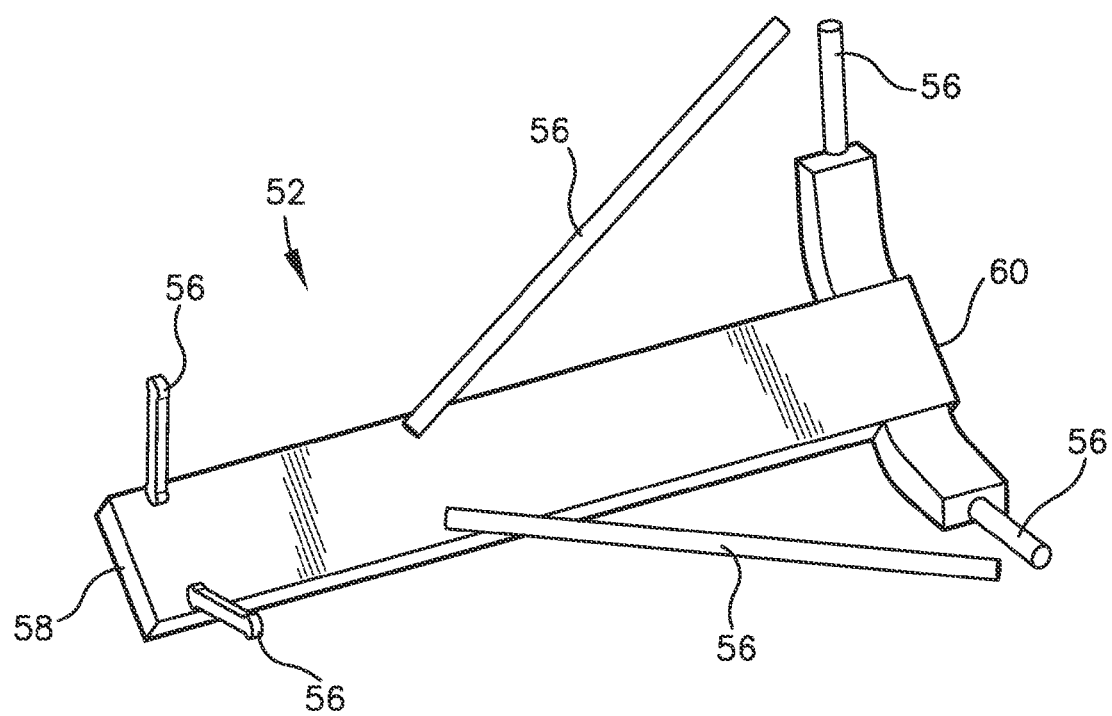

FIG. 17 is a perspective view of an alternative embodiment of the intermediate structure of FIG. 16.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An aircraft propulsion system 10 constructed in accordance with embodiments of the present invention is shown in FIGS. 1-15 and includes an engine fan module 12 and an engine core 14 which are attached and supported by an intermediate structure 16 to an airframe or pylon 18 of an aircraft. In some embodiments of the invention, portions of the aircraft propulsion system 10 may be surrounded by a fan case 20 with a nacelle inlet 22 attached thereto, as illustrated in FIGS. 7-10. Additionally, the aircraft propulsion system 10 may comprise a primary exhaust plug and nozzle 24 attached to an aft turbine frame of the engine core 14 or the fan module 12.

The propulsion system 10 may use any propulsion configuration known in the art, such as an empennage-mounted, open-rotor installation commonly known as a "pusher" configuration which has the engine core 14 located forward of the engine fan module 12, as illustrated in FIGS. 1-4. Alternatively, the propulsion system 10 may be an empennage-mounted, open-rotor installation commonly known as a "puller" configuration which has the engine core 14 located aftward of the engine fan module 12, as illustrated in FIGS. 5-6. In both of these empennage-mounted, open rotor installations, the engine fan module 12 may be a single shaft ring gear contra-rotating fan module or a twin shaft contra-rotating fan module. In another alternative embodiment of the invention, the propulsion system 10 may be an empennage mounted ducted turbofan having the fan case 20 at least partially surrounding the engine fan module 12 and the nacelle inlet 22 attached to the fan case 20, as illustrated in FIGS. 7-8. Furthermore, in another configuration of the invention, the propulsion system 10 may be an underwing mounted ducted turbofan having the fan case 20 and the nacelle inlet 22 illustrated in FIGS. 9-10. In yet another configuration, the propulsion system 10 may be a ducted prop-fan installation, as illustrated in FIG. 10.

The engine fan module 12 may be any aircraft engine fan module and may comprise a support frame 26 and/or shaft and one or more sets of blades 28 extending radially from and/or rotatably supported relative to the support frame or shaft. The support frame 26 or shaft may also comprise one or more mounting provisions 30 or flanges extending therefrom and configured to be mechanically attached to the intermediate structure 16, as later described herein. In some embodiments of the invention, the intermediate structure 16 suspends the engine fan module 12 in a configuration such that the blades 28 are forward or aftward of the pylon 18 to which the intermediate structure 16 attaches.

The engine core 14 may be any aircraft engine core and may also be referred to as a hot section of an aircraft engine. The engine core 14 may generally comprise a compressor, a combustor, a turbine, the primary exhaust plug or nozzle 24 and/or any other engine core components known in the art. The engine core may also comprise one or more mounting provisions 32 or flanges extending therefrom and configured to be mechanically attached to the intermediate structure 16, as later described herein.

The intermediate structure 16, as illustrated in FIGS. 12-16 may comprise a rigid ring portion 34 having an axial thickness bounded by a first circumferential edge 36 and a second circumferential edge 38 opposite of the first circumferential edge. The ring portion 34 may be cylindrical or ring-shaped and may extend 360 degrees or, in an alternative embodiment of the invention, may be a partial structural ring only extending circumferentially as far as necessary to connect to an interconnect structure, as later described herein. The first and second circumferential edges 36,38 may be opposing surfaces of the ring with a width in a radial direction relative to the ring portion. The first and second circumferential edges 36,38 may be configured to interface with the mounting provisions 30,32 of the fan assembly 12 and/or the engine core 14. For instance, in some embodiments of the invention, holes may be drilled into the first and second circumferential edges 36,38 or surfaces sized for bolts or attachment pins to be inserted therein. Thus, the fan assembly 12 and the engine core 14 may be bolted to the ring portion 34 of the intermediate structure 16.

In some embodiments of the invention, the intermediate structure 16 may also comprise a first flange 40 extending from the first circumferential edge 36 of the ring portion 34 and configured to align with the mounting provisions 30,32 of the engine fan module 12 and/or the engine core 14. Additionally, the intermediate structure 16 may comprise a second flange 42 extending from the second circumferential edge 38 of the ring portion 34 and configured to align with the mounting provisions 30,32 of the engine fan module 12 and/or the engine core 14. The first and second flanges 40,42, as illustrated in FIGS. 12-13, may be bolted or otherwise mechanically connected to the mounting provisions 30,32 of the fan module 12 and the engine core 14. For example, the fan module 12 may be bolted to the intermediate structure 16 directly by a circular pattern of bolts similar to the joint of prior art engine core to fan module interfaces. Likewise, the engine core 14 may be bolted to the intermediate structure 16 directly by a circular pattern of bolts.

In some embodiments of the invention, as illustrated in FIG. 12, the first and second flanges 40,42 may generally extend radially inward from the ring portion 34, toward a center axis of the ring portion 34. Additionally, the first and second flanges 40,42 may have first portions 44 angled slightly away from each other in the direction of axial thickness of the ring portion 34, and second portions 46 substantially parallel with each other and with the first and second circumferential edges 36,38 of the ring portion 34. In another alternative embodiment of the invention, the ring portion 34 may be attached to an interconnect structure 48 via interconnect links 50 extending radially inward toward a center axis of the ring portion 34, as in FIG. 13. The interconnect structure 48 may also be cylindrical or ring-shaped. In this embodiment of the invention, the first and second flanges 40,42 may extend radially outward from first and second edges of the interconnect structure 48 to connect the fan module 12 and the engine core 14 to the interconnect structure 48 supported by the ring portion 34 via the interconnect links 50, as illustrated in FIG. 13. Furthermore, in this embodiment of the invention, the ring portion 34 may be a partial structural ring only extending around a circumference as far as necessary to connect to the interconnect structure 48.

In some alternative embodiments of the invention, the ring portion 34 and/or interconnect structure 48 may be permanently fixed to the fan module 12, as illustrated in FIGS. 14-15. This configuration would allow for the removal of the engine core 14 while the fan module 12 remains fixed to the pylon 18. However, this configuration is limited in that the engine core 14 could not be supported by the pylon 18 if the fan module 12 was removed therefrom without the use of temporary bracing.

The intermediate structure 16 may further comprise and/or be attached to an elongated mount beam 52, as illustrated in FIGS. 16-17. The mount beam 52 may extend substantially perpendicular from the ring portion 34 at the first or second circumferential edge 36,38. In some embodiments of the invention, the mount beam 52 is integrally formed with the ring portion 34 and is of one-piece construction therewith. For example, as illustrated in FIG. 16, a substantially triangular or tapering section 54 may extend from a portion of the first or second circumferential edge 36,38 to the mounting beam 52 and may have a slightly curved surface corresponding to the curve of the ring portion 34. Likewise, the mounting beam 52 extending from the substantially triangular or tapering section 54 may have a slight curve corresponding with the curve of the ring portion 34, as illustrated in FIG. 16. In another embodiment of the invention, as illustrated in FIG. 17, the elongated mount beam 52 may be configured to be mechanically attached to the ring portion 34 of the intermediate structure 16.

As illustrated in FIGS. 16-17, the intermediate structure 16 may also comprise one or more support links 56 extending from the mount beam 52 and configured to join the ring portion 34 with the mount beam 52 and/or to join the mount beam 52 with the engine core 14. For example, two support links 56 may extend from the mount beam 52 at or proximate to a first end 58 of the mount beam 52 substantially opposite of a second end 60 of the mount beam 52 at which the ring portion 34 is attached. The support links 56 at the first end 58 of the mount beam 52 may be angled slightly away from each other and may be substantially parallel with the flanges 40,42 or edges 38,36 of the ring portion 34, as illustrated in FIG. 16. Furthermore, some support links 56 may extend from a point between the first end 58 of the mount beam 52 and the second end 60 of the mount beam 52 to the engine core 14 and/or the ring portion 34 of the intermediate structure 16. Finally, support links 56 may extend from the mount beam 52 at or proximate to the second end 60 of the mount beam 52 and be configured to attach the mount beam 52 to the ring portion 34 of the intermediate structure 16, as illustrated in FIG. 17.

The ring portion 34, mount beam 52, and any of the support links 56 may be fastened or welded together and/or constructed as a single casting or multiple castings joined together. Furthermore, the intermediate structure 16 may be constructed as a fastened assembly consisting of internal frames and bulkheads covered by stressed skins or composites. In general, the intermediate structure 16 and/or the components thereof may be configured to react to combined loads of the engine core 14 and the fan module 12.

The intermediate structure 16 may be configured for fixedly attaching to the pylon 18 of the aircraft. Specifically, the ring portion 34 and/or the mount beam 52 may be detachably or permanently attached to or integrally formed with the pylon 18 (i.e., monolithic, one-piece construction). For example the intermediate structure 16 may comprise attachment features configured for attaching the ring portion 34 and/or the mount beam 52 to the pylon 18. In various embodiments of the invention, the mount beam 52 may be integrally formed with the pylon 18, mechanically fastened to the pylon 18 using bolts or other mechanical, detachable fasteners, and/or otherwise mounted to the pylon 18 using any combination of attachment methods. The ring portion 34, fixed to the second end 60 of the mount beam 52, may be fixed relative to the pylon 18 via the mount beam 52 and/or directly fixed to the pylon 18. For example, the ring portion 34 may be fixed to the pylon 18 by integrally forming the ring portion 34 and the pylon 18, mechanically fastening the ring portion 34 to the pylon 18, and/or otherwise mounting the ring portion 34 to the pylon 18 using any combination of attachment methods. Note that any portion of the intermediate structure 16 may alternatively be mounted to another portion of the airframe without departing from the scope of the invention.

In some embodiments of the propulsion system 10, such as the "pusher" configuration noted above, the intermediate structure 16 or ring portion 34 thereof may be configured with passageways to allow driving exhaust gases to move from a gas turbine exit of the engine core 14 to an entrance of a gas-powered embodiment of the fan module 12. A similar configuration may be used to allow passage of exhaust gasses from the engine core turbine to the primary exhaust. The intermediate structure 16 may also be configured to be compatible with shaft-driven propulsion systems.

The intermediate structure 16 may further comprise or have mounted thereto at least one gearbox 62, such as a speed reduction gearbox or various accessory gearboxes, as illustrated in FIGS. 7-10. For example, a shaft-driven propulsion system may connect a shaft of the engine core 14 with the fan module 12 via a speed reduction gearbox mounted to and supported by the intermediate structure 16 or the ring portion thereof. The speed reduction gearbox may allow the rotation speeds of the engine core 14 and fan module 12 to be optimized independently. In some embodiments of the invention, the speed reduction gearbox may be an integral part of the intermediate structure 16. Alternatively, the speed reduction gearbox may be supported by the engine core 14 or the fan module 12.

The gearbox 62 may also include an engine accessory gearbox integrated with, fixed to, and/or supported by the intermediate structure 16. The engine accessory gearbox may be configured to accept shaft horsepower from the engine core and, through a series of gears, provide rotary power to accessories mounted to the engine accessory gearbox. Accessories may include aircraft power generators and hydraulic pumps, as well as engine-dedicated fuel pumps, hydraulic pumps, and generators. An engine accessory gearbox independent from the engine core 14 (i.e., supported by the intermediate structure 16) may require fewer service connections to be broken to remove the engine core 14 or fan module 12. The intermediate structure-mounted engine accessory gearbox may be driven through an inline power take-off gearbox also supported by the intermediate structure 16.

The gearbox 62 or gearboxes of the propulsion system 10 may be divided between engine-dedicated accessories and those for the aircraft. In some embodiments of the invention, aircraft accessories and gearboxes may be supported by and/or integrated with the intermediate structure 16, while engine-dedicated accessories may be driven by an engine core-mounted gearbox.

In use, the fan module 12 may be bolted to the intermediate structure 16 independently of the engine core 14. For example, the mounting provisions 30 of the fan module 12 may be bolted or otherwise attached to the first flange 40 of the ring portion 34 and the mounting provisions 32 of the engine core 14 may be bolted or otherwise attached to the second flange 42 of the ring portion 34. To remove just the engine core 14, the engine core 14 may be unbolted or unattached from the intermediate structure 16 while the fan module 12 remains bolted to the intermediate structure 16. Furthermore, the support links 56 may also be disconnected from the engine core 14. To remove just the fan module 12, the fan module 12 may be unbolted or unattached from the intermediate structure 16 while the fan module 12 remains bolted to the intermediate structure 16. During removal of the fan module 12 and/or the engine core 14, one or more connections to the gearboxes 62 attached to the intermediate structure 16 may need to be disconnected.

The present invention provides a number of advantages over the prior art. Specifically, the intermediate structure 16 allows installation and/or removal of either the fan module 12 or the engine core 14 without additional supporting or bracing ground support equipment (GSE). However, if needed, GSE attachments for lowering or raising the engine core 14 or fan module 12 may be added to the intermediate structure 16. Furthermore, handling of the fan module 12 and engine core 14 independently is easier, since less mass and volume is required to be raised, lowered, or positioned. In some embodiments of the invention, pre-assembly of the intermediate structure 16, the engine core 14, and the fan module 12 would allow the propulsion system 10 to be installed on the pylon 18 as a unit, if desired. This could be beneficial to original equipment manufacturers (OEM) during an initial build of an aircraft to shorten installation time. Another advantage of the present invention is that the ring portion 34 transmits torque from the fan module 12 directly to the pylon 18 or airframe, so that the engine core 14 does not have to be built to accommodate for the torque from the fan module 12.

The present invention may also allow for standardized engine mounting flanges on the ring portion 34, such that different engine cores and fan modules may be joined with each other. This allows for competition that is not necessarily tied to the engine core 14. It may be possible to have a single fan module or rotor design for the airframe with a customer option for which gas generator or engine core is used to drive the fan module 12.

Another advantage of the present invention is the integration of the accessory gearbox and/or the fan speed reduction gearbox with the intermediate structure 16. This reduces the number of connections between the engine core 14 and the aircraft that must be disconnected prior to engine core removal and removes the suspended mass of the installation from the engine core 14. Since the mass of the accessory gearbox is not placed on the engine core 14, engine case distortion and subsequent performance penalties are reduced. Incorporation of the fan speed reduction gearbox between the fan module 12 and the engine core 14 allows each of the components' rotational speeds to be optimized independently. Because it is part of the intermediate structure 16, the cantilevered mass of the gearbox 62 can be reduced over that of a gearbox included as part of the fan module 12.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of coupling and decoupling an engine core with an engine fan module via an intermediate structure of an aircraft, the method comprising:

mechanically attaching the engine core to the intermediate structure at a first edge of the intermediate structure, wherein the intermediate structure has a ring-shaped portion that is rigid and is mounted directly to a pylon or airframe of the aircraft;

mechanically attaching the engine fan module to the intermediate structure at a second edge of the intermediate structure, wherein the second edge of the intermediate structure is opposite of the first edge; and mechanically disconnecting and removing one of the engine core and the engine fan module from the intermediate structure while another one of the engine core and the engine fan module remains mechanically attached to and supported on the aircraft by the intermediate structure.

2. The method of claim 1, wherein the step of mechanically disconnecting and removing comprises disconnecting and removing the engine core from the intermediate structure while the engine fan module remains mechanically attached to and supported on the aircraft by the intermediate structure.

3. The method of claim 1, wherein the step of mechanically disconnecting and removing comprises disconnecting and removing the engine fan module from the intermediate structure while the engine core remains mechanically attached to and supported on the aircraft by the intermediate structure.

4. The method of claim 1, wherein a fan speed reduction gearbox is mounted to the intermediate structure, wherein the steps of mechanically attaching the engine core and the fan module to the intermediate structure further comprise attaching rotary components of the engine core and the engine fan module with rotary components of the fan speed reduction gearbox mounted to the intermediate structure, wherein the fan speed reduction gearbox is configured for compensating for a difference in rotary speed between the engine core and the fan module.

5. The method of claim 1, wherein the intermediate structure further comprises an elongated mount beam having a first end integrally formed with the ring-shaped portion at the first edge or the second edge and a second end opposite of the first end.

6. The method of claim 5, further comprising attaching the engine core to the second end of the elongated mount beam to structurally support the engine core.

7. The method of claim 1, wherein an accessory gearbox is mounted to the intermediate structure, wherein the steps of mechanically attaching the engine core and the fan module to the intermediate structure further comprising attaching rotary components of the engine core and the engine fan module with rotary components of the accessory gearbox, wherein the accessory gearbox is configured to provide rotary power from the engine core or the fan module to other accessories of the aircraft.

8. A method of coupling and decoupling an engine core with an engine fan module via an intermediate structure of an aircraft, the method comprising:
  mechanically attaching the engine core to a ring-shaped portion of the intermediate structure at a first edge of the ring-shaped portion, wherein the ring-shaped portion is rigid, wherein the intermediate structure further includes an elongated mount beam having a first end integrally formed with the ring-shaped portion and a second end opposite of the first end, wherein the intermediate structure is mounted directly to a pylon or airframe of the aircraft;
  mechanically attaching the engine fan module to the ring-shaped portion at a second edge of the ring-shaped portion, wherein the second edge is opposite of the first edge; and
  mechanically disconnecting and removing the engine core from the intermediate structure while the engine fan module remains mechanically attached to and supported on the aircraft by the intermediate structure; or
  mechanically disconnecting and removing the engine fan module from the intermediate structure while the engine core remains mechanically attached to and supported on the aircraft by the intermediate structure.

9. The method of claim 8, wherein a fan speed reduction gearbox is mounted to the intermediate structure, wherein the steps of mechanically attaching the engine core and the fan module to the intermediate structure further comprise attaching rotary components of the engine core and the engine fan module with rotary components of the fan speed reduction gearbox mounted to the intermediate structure, wherein the fan speed reduction gearbox is configured for compensating for a difference in rotary speed between the engine core and the fan module.

10. The method of claim 8, further comprising attaching the engine core to the second end of the elongated mount beam to structurally support the engine core.

11. The method of claim 8, wherein an accessory gearbox is mounted to the intermediate structure, wherein the steps of mechanically attaching the engine core and the fan module to the intermediate structure further comprising attaching rotary components of the engine core and the engine fan module with rotary components of the accessory gearbox, wherein the accessory gearbox is configured to provide rotary power from the engine core or the fan module to other accessories of the aircraft.

12. The method of claim 8, wherein the intermediate structure further comprises a first attachment flange extending from the ring-shaped portion at the first edge and a second attachment flange extending from the ring-shaped portion at the second edge, wherein the step of mechanically attaching the engine core to the ring-shaped portion comprises mechanically attaching the engine core to the first attachment flange, wherein the step of mechanically attaching the engine fan module to the ring-shaped portion comprises mechanically attaching the engine fan module to the second attachment flange.

13. The method of claim 12, wherein mechanically attaching includes bolting portions of the engine core and the engine fan module to the first and second attachment flanges, respectively.

14. The method of claim 8, further comprising attaching one or more support links extending from the second end of the mount beam to the engine core.

15. The method of claim 8, wherein the mount beam further comprises a substantially tapering section extending from the first edge of the ring-shaped portion to a point between the first and second ends of the elongated mount beam, wherein the substantially tapering section tapers in a direction away from the first end of the mount beam.

16. The method of claim 8, further comprising attaching at least one support link from the mount beam to the ring portion and at least one support link from the second end of the mount beam to the engine core.

17. A method of coupling and decoupling an engine core with an engine fan module via an intermediate structure of an aircraft, the method comprising:
  mechanically attaching the engine core to a ring-shaped portion of the intermediate structure at a first edge of the ring-shaped portion, wherein the ring-shaped portion is rigid;
  mechanically attaching the engine fan module to the ring-shaped portion at a second edge of the ring-shaped portion, wherein the second edge is opposite of the first edge;
  attaching the engine core to a second end of an elongated mount beam of the intermediate structure to structurally support the engine core, wherein the elongated mount beam has a first end integrally formed with the ring-shaped portion and the second end opposite of the first end, wherein the intermediate structure is mounted directly to a pylon or airframe of the aircraft; and mechanically disconnecting and removing the engine core from the ring-shaped portion and the elongated mount beam while the engine fan module remains mechanically attached to the ring-shaped portion and thus supported on the aircraft by the intermediate structure; or mechanically disconnecting and removing the engine fan module from the ring-shaped portion while the engine core remains mechanically attached to the ring-shaped portion and the elongated mount beam and thus supported on the aircraft by the intermediate structure.

18. The method of claim 17, wherein a fan speed reduction gearbox is mounted to the intermediate structure, wherein the steps of mechanically attaching the engine core and the fan module to the intermediate structure further comprise attaching rotary components of the engine core and the engine fan module with rotary components of the fan speed reduction gearbox mounted to the intermediate structure, wherein the fan speed reduction gearbox is configured for compensating for a difference in rotary speed between the engine core and the fan module.

19. The method of claim 17, wherein an accessory gearbox is mounted to the intermediate structure, wherein the steps of mechanically attaching the engine core and the fan module to the intermediate structure further comprising attaching rotary components of the engine core and the engine fan module with rotary components of the accessory gearbox, wherein the accessory gearbox is configured to provide rotary power from the engine core or the fan module to other accessories of the aircraft.

20. The method of claim 17, wherein the intermediate structure further comprises a first attachment flange extending from the ring-shaped portion at the first edge and a second attachment flange extending from the ring-shaped portion at the second edge, wherein the step of mechanically attaching the engine core to the ring-shaped portion comprises bolting portions of the engine core to the first attachment flange, wherein the step of mechanically attaching the engine fan module to the ring-shaped portion comprises bolting portions of the engine fan module to the second attachment flange.

* * * * *